April 7, 1970 S. WALD ET AL 3,505,667

CODE CONVERTER

Filed April 30, 1965 2 Sheets-Sheet 1

INVENTORS
SIDNEY WALD &
LEROY H. WERNER
BY
Edward J Norton
Attorney

CODE CONVERTER

Filed April 30, 1965

INVENTORS
SIDNEY WALD &
LEROY H. WERNER
BY Edward J. Norton
Attorney 3,505,667

CODE CONVERTER

Sidney Wald, Cherry Hill, N.J., and Leroy H. Werner, Levittown, Pa., assignors to Radio Corporation of America, a corporation of Delaware Filed Apr. 30, 1965, Ser. No. 452,084
Int. Cl. G08c 9/00, 11/00; G06f 5/00
U.S. Cl. 340—347 9 Claims

ABSTRACT OF THE DISCLOSURE

Morse code signals characterized by mark and space signal levels are applied to an input means including a differentiator whereby the mark signals are differentiated to provide both leading and trailing edge pulses. A counter means is responsive to both the leading and trailing edge pulses to provide a first (dash) or second (character space) pulse each time the counter reaches a predetermined number of counts and there is present a mark (dash) or space (character space) signal level. A binary shift register means shifted by the leading edge pulses is set by the first (dash) and second (character space) pulses to provide binary codes representations of the input signal.

Figures 1A, 1B:
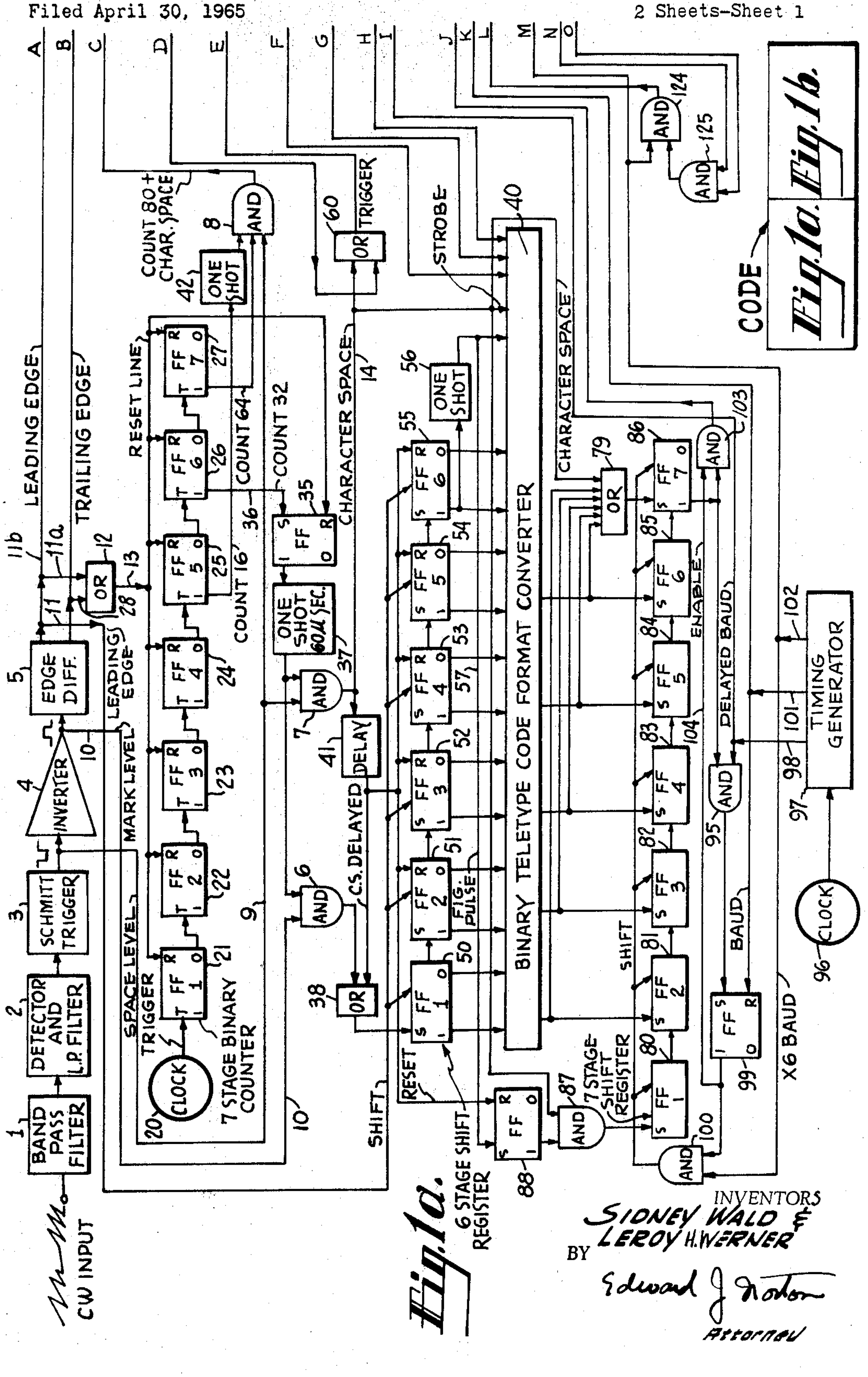
Figure 1B:
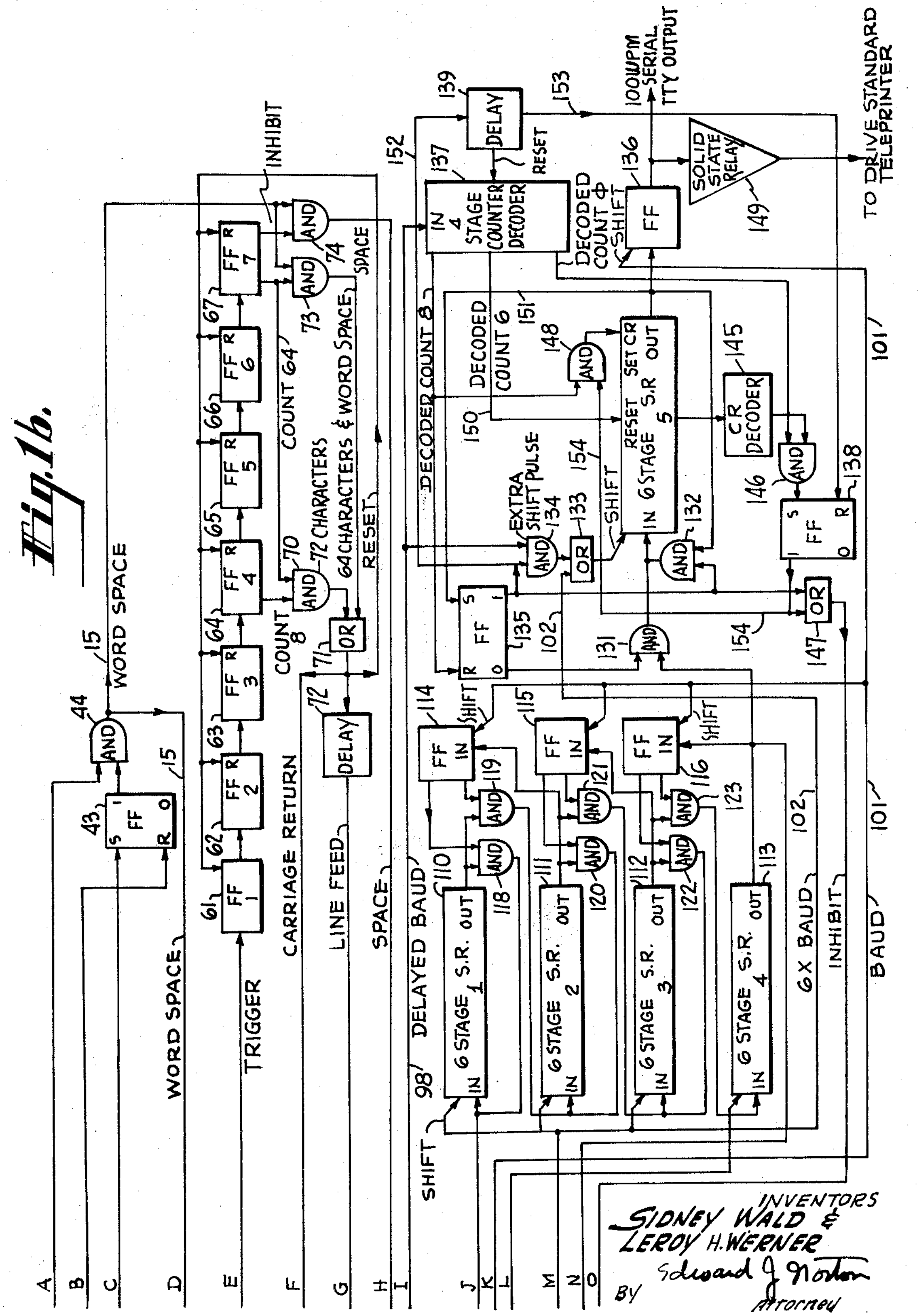

This invention relates to code converters and, more particularly, to an improved code converter capable of translating asynchronous or irregular time spaced code signals into synchronous or regular time spaced code signals using standard digital circuit components.

Code translators or converters using either analog or digital techniques that are responsive to irregular time spaced or asynchronous code signals are known. Consideration has also been given to asynchronous code converters using a combination of analog and digital techniques. In providing code translating equipment responsive to asynchronous signals, the previously known equipments have inherent limitations in their approach that render them capable of working only with code signals of closely defined and otherwise restricted coding characteristics, i.e., the duration of bit intervals. Because of these limitations, the use of prior equipment dictates that code character intervals, even though of an asynchronous nature, be within an assigned length or, when digital techniques involving a counter are used, that a given number of counts occur for the character intervals. While some degree of tolerance is and must be provided to distinguish between the code characters due to the asynchronous nature thereof, the prior equipments due to the required adherance to certain standards have proven inadequate to handle asynchronous code signals such as hand sent Morse which do not meet these standards.

It is an object of this invention to provide an improved asynchronous to synchronous code converter.

It is another object to provide simpler and more reliable means to translate an asynchronous code signal, for example, hand sent Morse code, into synchronous digital code signals.

It is another object of the invention to provide an improved Morse code translation system capable of accurate and reliable performance in spite of wide variations in sending rate and individual variations in the code character formation.

It is a further object to provide an improved buffer means using an arrangement of recirculating registers and control flip-flops.

The foregoing objects are accomplished in accordance with one embodiment of the invention wherein there is provided an input means responsive to an input Morse code signal. Such a signal is defined by a first signal level or mark element of varying time duration representing the presence of signal information and a second, different signal level or space or varying time duration representing the absence of signal information. The input means functions to produce over a first output path a pulse representing the beginning of any signal interval or mark signal element, over a second output path a pulse representing the end of a mark signal element, over a third output path a first level representing the existence of a mark signal element and over a fourth output path a level representing the existence of a space signal level.

The time duration of the mark signal elements and space intervals define the Morse code characters and the words composed of these characters. The shortest time duration Morse code mark signal element is the dot. The dot is ideally of the same length as the space interval between suceeding mark signal intervals. A predetermined longer mark signal element time duration, ideally three times the dot interval, is the dash. The dash is ideally of the same length as the space interval between succeeding characters composed of the dots and dashes. The longest predetermined time duration, ideally seven times the dot interval, defines the space between words made up of the characters.

A counter means is provided to identify the received mark or dot-dash signal elements and the space intervals. The counter means is responsive to the pulses appearing over the first and second output paths of the input means to measure the time duration of each mark signal element by counting the time between the pulses appearing over the two output paths and therefore the time between the beginning and the end of a received mark signal element. The counter means further measures the time duration of any space signal interval by counting the time between the end of the previous mark signal element and the beginning of the next signal element. When the counter means reaches a predetermined number of counts which defines either a dash signal element or a space between succeeding characters and there is present a level over the third output path of said input means representing the existence of a mark signal element, the output of the counter means provides over a first output path a signal level of a certain time duration representing a dash signal element. When the counter means reaches a predetermined number of counts which defines either a dash element or a space between succeeding characters and there is present a level over the fourth output path of said input means representing the existence of a space interval, the output of the counter means provides over a second output path a signal level of a certain time duration representing the presence of the space interval between characters. When the counter means reaches a predetermined, still longer number of counts and there is present a level over the fourth output path of said input means representing the existence of a space interval, the output of the counter means provides over a third output path a signal level of a certain time duration representing the presence of a space interval between words.

A shift register means is responsive to the pulses appearing over the first mentioned output path from the input means representing the beginning of any mark signal element to shift the register and is further responsive to the signal levels or conditions over the first and second output paths of the counter means to produce a unique binary code that represents a received signal character. Encoding means are provided responsive to this binary code to provide a desired output code for the converter. In the embodiment to be described, such encoding means are arranged to translate the unique binary code into a standard, five unit digital code for operating a teletypewriter. In this manner, a translator is provided for electronically operating a standard teletypewriter directly and automatically from a hand sent or Morse Code input. By the arrangement of the invention, a highly reliable performance by the translator is achieved even when the Morse code or other received asynchronous signal input is susceptible to wide variations in sending rate and character formation.

The invention will now be described in greater detail in connection with the single figure, consisting of FIGURES 1*a* and 1*b*, of the accompanying drawing which is a block diagram of one embodiment of a code converter constructed according to the invention.

The basis of this equipment is a digital logic configuration that is sensitive primarily to an incoming code pattern rather than preset, rigid, standard coding intervals. The equipment is in the nature of a character recognition system which has built-in tolerances to mark-space ratios and the various operator idiosyncracies which are encountered in hand-keyed Morse.

The mark signal element (dots or dashes) is defined as that portion of the Morse code character where there is the presence of a signal, and a space signal element is defined as that portion of the Morse code signal where there is the absence of a signal. The marks and spaces in a Morse code character have the following nominal characteristics:

(a) A dot equals one time unit;

(b) An element space (space between adjacent mark signal elements) equals one time unit;

(c) A dash equals three time units;

(d) A character space (space between two Morse characters) equals three time units;

(e) A word space (space between words composed of Morse characters) equals seven time units.

Operator hand-keyed, distorted Morse code signals which are received over a radio path, land line or other transmission means, not shown, are applied to a typical bandpass filter network 1 where the input bandwidth is restricted. The output from the bandpass filter 1 is fed to a detector and low pass filter 2 where the input signal is detected and filtered to produce filtered negative-going signal pulses representing the Morse code signals. The detected and filtered negative-going pulses from the detector and low pass filter 2 are squared by a suitable trigger or Schmitt circuit 3. The negative-going squared pulses from the trigger circuit 3 are amplified and inverted by inverter 4. The resulting positive-going pulses are applied to an edge differentiator 5 where the positive-going pulses are differentiated and separated by a clipping means so as to provide positive-going edge pulses at the beginning of every Morse code mark signal element and by inversion positive-going trailing edge pulses at the end of every Morse code mark signal element. The presence or absence of the Morse code mark signal element pulses at the output of inverter 4 is used to provide signal levels to prime AND gate 6 over lead 10. The presence or absence of the pulses at the output of trigger circuit 3 is used to provide signal levels to prime AND gates 7 and 8 over a lead 9. The mark level, indicating the presence of any mark signal element, provides a "one" state during the positive-going output pulse at the inverted output of the trigger circuit 3, and this "one" condition is used to prime AND gate 6 over lead 10. The space level, indicating the absence of any mark signal element, provides a "one" state during the absence of the negative-going output pulse at the output of the trigger circuit 3, and this "one" condition is used to prime AND gates 7 and 8 over lead 9. The leading edge pulses provided as one of the outputs of differentiator 5 are applied over lead 11 as shift pulses to a binary shift register made up of six flip-flop stages 50 through 55. The leading and the trailing edge pulses appearing at the output of the differentiator 5 are applied via leads **11*a* and 28 through an OR gate 12 and over lead 13 to a time duration counter made up of a clock generator 20 and seven flip-flop stages 21 through 27**.

The time duration counter made up of clock pulse generator 20 and the seven flip-flop stages 21 through 27 determines the time duration of any received mark signal element or space interval by generating relatively high frequency clock pulses from the clock pulse generator 20 and by changing at a corresponding rate, the states of the seven flip-flop states 21 through 27. The frequency of an interval clock determines the actual word per minute speed range of the counter. By way of example, the following six clock frequencies may be used for six ranges:

| | | |
|---|---|---|
| (1) | C.p.s. 1020 | 43.2 to w.p.m. 100 |
| (2) | 680 | 28.8 to 67.2 |
| (3) | 510 | 21.6 to 50.2 |
| (4) | 340 | 4.4 to 33.6 |
| (5) | 255 | 10.8 to 25.1 |
| (6) | 170 | 7.2 to 16.8 |

The word per minute limits in the example have been arbitrarily set to accommodate a w.p.m. range 2⅓ to 1 so as to provide sufficient overlap to prevent possible marginal operation at the extreme ends of any range. During operation, the range which most closely centers the incoming w.p.m. rate should be selected.

The time duration counter logic is arranged so as to cause flip-flop stages $n$ to change state at $2^{n-1}$ counts. The first stage 21, therefore, will change state every ($n=1$, $2^{1-1}=2^0=1$) count, the second stage 22 every ($2^{2-1}=2^1=2$) second count, the third stage every ($2^{3-1}=2^2=4$) fourth count, the fourth stage 24 every ($2^{4-1}=2^3=8$) eighth count, the fifth stage 25 every ($2^{5-1}=2^4=16$) sixteenth count, the sixth stage 26 every ($2^{6-1}=2^5=32$) thirty-second count, and the seventh stage every ($2^{7-1}=2^6=64$) sixty-fourth count. The counter has the capacity of counting up to $2^7$ or 128 clock pulses.

The identification of any mark signal element or space interval is determined by the number of clock pulses generated during the presence of a received mark signal element or a space interval. When any mark signal element appears, that is, either a dot or a dash, the leading edge pulse provided at the output of edge differentiator 5 is applied over lead **11*a* to reset the counter flip-flop stages 21 through 27 through OR gate 12 and over lead 13. At the termination of any mark signal element, the trailing edge pulse provided at the output of edge differentiator 5 is applied over lead 28 to reset the counter flip-flop stages 21 through 27 through OR gate 12 and over lead 13. In this manner, the time duration of any mark signal element will be determined by the number of clock pulses generated between the leading edge pulse corresponding to the start of any mark signal element and the trailing edge pulse corresponding to the end of that mark signal element. At the termination of any mark signal element, a space interval or condition exists and, therefore, the trailing edge pulse corresponding to the end of a mark signal element provided at the output of the edge differentiator 5 over lead 28 through OR gate 12 and over lead 13 resets counter stages 21 through 27. When the next mark signal element is received, which indicates the end of the space interval, a leading edge pulse is provided at the output of edge differentiator 5. The leading edge pulse corresponding to the start of any mark signal element over lead 11*a* resets the counter flip-flop stages 21 through 27 through OR gate 12 and over lead 13**. In this manner, the time duration of any space interval will be determined by the number of clock pulses generated between the trailing edge pulse of a mark signal element, dot or dash, and the leading edge pulse of the next mark signal element.

When thirty-two or more clock pulses are generated between reset pulses, the sixth flip-flop stage 26 changes to a "one" state by the logic previously described whereby the sixth flip-flop changes state every ($2^{n-1}=2^5=32$) thirty-two counts. When the sixth flip-flop 26 changes to a "one" state, flip-flop 35 is set over lead 36. When flip-flop 35 is set, the output from flip-flop 35 triggers a one-shot multivibrator 37 to produce a 60-$\mu$sec. pulse at its output to AND gates 6 and 7. These 60-$\mu$sec. output pulses are used to indicate a three time unit signal. Any mark signal element or space interval duration that resets the counter at less than thirty-two counts is considered a one time unit signal and results in no output pulses being produced by the counter. There are two types of three time unit signals as set forth at the beginning of this description. The one type is a character space, which indicates the space interval between two Morse characters, and the other is a dash. The two can be distinguished by determining the presence of mark or space levels at the input. When the one-shot multivibrator 37 is triggered to apply the 60-$\mu$sec. pulse to AND gates 6 and 7 during the reception of a mark signal element, the signal level indicating the presence of a mark signal element at the output of inverter 4 primes AND gate 6 over lead 10 to provide a dash pulse through OR gate 38 to the set input of the first flip-flop stage 50 of the shift register made up of flip-flop stages 50 through 55. When one-shot multivibrator 37 is triggered to produce a 60-$\mu$sec. pulse to AND gates 6 and 7 during the absence of a mark signal element at the input, the signal level indicating the absence of a mark signal element at the output of the trigger circuit 3 primes AND gate 7 over lead 9 to provide a character space pulse. The character space pulses at the output of AND gate 7 are applied as count pulses to a character counter to be described, as strobe pulses to an AND Gate Binary/Teletype Converter 40 also to be described, as set pulses to the first flip-flop stage 50 of the shift register made of flip-flop stages 50 through 55 through delay 41 and OR gate 38, and as reset pulses through delay 41 to flip-flop 88 to be described and to the second through the sixth flip-flop stages 51 through 55 of the shift register.

When eighty clock pulses are generated between reset pulses applied to the counter, the seventh flip-flop 27 of the counter representing $2^6$ or sixty-four counts will have changed to a "one" state. Upon the sixteenth count thereafter, the fifth flip-flop 25, representing $2^4$ or sixteen counts, changes to a "one" state triggering one-shot multivibrator 42. The triggered output from the one-shot multivibrator 42 representing sixteen counts and the "one" state output at the seventh flip-flop 27 representing sixty-four counts are applied to the AND gate 8. If at the count of eighty a space level indicating the absence of a mark signal element at the output of the trigger circuit 3 primes AND gate 8 over lead 9, AND gate 8 generates an output pulse defining a count of 80 plus a character space. The requirement for the absence of a mark signal element to exist will allow a dash to be detected when the time duration of the element is eighty counts or more, and therefore, any mark signal element that is thirty-two counts or more will be defined as a dash. Any output pulse from AND gate 8 sets flip-flop 43. When flip-flop 43 is set, an output pulse is applied to AND gate 44. AND gate 44 is enabled by the leading edge of any mark signal element, (indicating the end of a space interval) provided at the output of the edge differentiator 5 over lead **11*b* to produce a word space pulse which is applied to the character counter to be described and to the binary/teletype code format converter 40**. The word space pulses as defined above nominally represent seven time units. In the practical embodiment of the word space logic, five time units has been found to respond more accurately to hand sending.

The information available from the duration counter 20 through 27 can now be used with the understanding that less than thirty-two counts is a dot or a space interval between mark signal elements, thirty-two to eighty counts is a dash or a character space, and eighty or more counts is a word space. By monitoring the output of the trigger circuit 3 and of the inverter 4 to determine the presence or absence of a mark signal element and comparing this information to the count reached by the counter, a decision can be made as to which of the five possible conditions "*a*" through "*e*" mentioned previously of the Morse code is present.

It is now necessary to combine the data available as to the nature of a received character and to translate that character into a binary form which can eventually be used in teletype or other desired operation. This is accomplished by the generation of a unique binary code in the shift register made up of the six flip-flop stages 50 through 55. The shift register so provided is standard both in operation and construction. The first stage of the register, flip-flop 50, has two inputs. The S input sets flip-flop 50 to the "one" state from its normally "zero" state. The shift input advances the flip-flop state and returns the first flip-flop stage 50 to its normally "zero" state. The remaining flip-flop stages 51 through 55 in the shift register record the condition of the previous stage at the time a shift pulse occurs. Any leading edge pulse corresponding to the start of any mark signal element at the output of edge differentiator 5 over lead 11 shifts the register. The sequence of operation is described in the paragraph below.

The first flip-flop 50 is initially set to a "one" state by the "C.S. (characted space) delayed" to tag the length, that is, the number of signal elements in a Morse character. A unique binary code is produced by using the various output pulses describe above from the duration counter to individually set the register with the leading edge of any mark signal element received over lead 11 from the edge differentiator 5 acting to shift the register. The leading edge pulse provided by each dot or dash at the output of differentiator 5 shifts the register in order. When the time duration counter 20 through 27 detects a dash, a set pulse, in addition to the previously described shift pulse, is provided to the first flip-flop 50 through OR gate 38. This set pulse serves to set the first flip-flop 50 to the "one" state and does not affect the following stages. When a character space is detected, the AND gate 7 operates as described to send a strobe pulse to binary/teletype code format converter 40 and a character space pulse to OR gate 79 and AND gate 87 to be described. After passing through the 60-$\mu$sec. delay 41, the pulse defining the character space at the output of AND gate 7 operates to set the first flip-flop 50 to the "one" state via OR gate 38 and to reset flip-flop 88 to be described and the remaining flip-flops of the shift register 51 through 55 so as to make ready for the next set of data. A dot in Morse code is represented in this shift register by a "zero" and a dash by a "one." An example using the R Morse character is presented in the following chart.

| | 1st FF–50 | 2nd FF–51 | 3rd FF–52 | 4th FF–53 | 5th FF–54 | 6th FF–55 |
|---|---|---|---|---|---|---|
| Initial condition | TAG 1 | 0 | 0 | 0 | 0 | 0 |
| Leading edge of first dot shifts register | DOT 0 | TAG 1 | 0 | 0 | 0 | 0 |
| Leading edge of dash shifts register | 0 | DOT 0 | TAG 1 | 0 | 0 | 0 |
| AND gate 6 initiates dash pulse which sets FF–50 | DASH 1 | do | do | 0 | 0 | 0 |
| Leading edge of second dot shifts register | DOT 0 | DASH 1 | DOT 0 | TAG 1 | 0 | 0 |

The Morse character representing R which is a dot-dash-dot is thus established in the shift register. In effect, the leading edge of the first dot shifts the register so that the "one" state at the first flip-flop 50 then present therein shifts to the second flip-flop 51. With the normal steering input held to a zero, the first flip-flop 50 returns to zero and will remain so until set to a "one" by a dash pulse or a delayed character space pulse. The leading edge of the dash shifts the "one" state at the second flip-flop 51 to the third flip-flop 52. Since the second mark signal element is a dash, a dash pulse from the duration counter 20 through 27 sets the first flip-flop 50 to the "one" state. The leading edge of the second dot shifts the register so that was at the first flip-flop 50 through the third flip-flop 52 is now respectively at the second flip-flop 51 through the fourth flip-flop 53. By reading from right to left, the first "one" present at the fourth flip-flop 53 indicates the start of the binary representation of the Morse character R. Since R is represented by dot-dash-dot where dot is a "zero" and dash a "one," the unique binary code recorded in the first three flip-flops 50 through 52 in the case of the character R defines the Morse code character. When a "one" state has been shifted into the sixth flip-flop 55, indicating five mark signal elements (the Morse figures characters), a figure pulse is generated through one-shot multivibrator 56 to set over lead 57 a flip-flop 88 for purposes to be described. While the operation of the shift register comprising stages 50 through 55 in establishing a binary code for only one Morse character R has been described, the operation follows that described for the other Morse characters. The unique binary code for each of the Morse characters is shown in the following table.

| | Morse Code | Binary Coded Morse |
|---|---|---|
| Character: | | |
| A | · — | 101000 |
| B | — · · · | 000110 |
| C | — · — · | 010110 |
| D | — · · | 001100 |
| E | · | 010000 |
| F | · · — · | 010010 |
| G | — — · | 011100 |
| H | · · · · | 000010 |
| I | · · | 001000 |
| J | · — — — | 111010 |
| K | — · — | 101100 |
| L | · — · · | 001010 |
| M | — — | 111000 |
| N | — · | 011000 |
| O | — — — | 111100 |
| P | · — — · | 011010 |
| Q | — — · — | 101110 |
| R | · — · | 010100 |
| S | · · · | 000100 |
| T | — | 110000 |
| U | · · — | 100100 |
| V | · · · — | 100010 |
| W | · — — | 110100 |
| X | — · · — | 100110 |
| Y | — · — — | 110110 |
| Z | — — · · | 001110 |
| Ø | — — — — — | 111111 |
| 1 | · — — — — | 111101 |
| 2 | · · — — — | 111001 |
| 3 | · · · — — | 110001 |
| 4 | · · · · — | 100001 |
| 5 | · · · · · | 000001 |
| 6 | — · · · · | 000011 |
| 7 | — — · · · | 000111 |
| 8 | — — — · · | 001111 |
| 9 | — — — — · | 011111 |

The unique binary code is then fed, character by character, from stages 50 through 55 of the shift register to the binary/teletype code format converter 40 where a conventional diode matrix decodes each of the unique binary code characters received into a single line output and this single line output is thereafter re-encoded through a conventional matrix into its equivalent 5-bit teletype code. This latter code is converted into 6-bit serial form by means of a parallel-to-serial teletype code shift register including flip-flop stages 80 through 86.

The recognition of the number of characters and word spaces so as to apply line feed and carriage return codes to the binary/teletype code format converter 40 is performed by a character counter, flip-flop stages 61 through

67. The carriage return and line feed codes are provided when either seventy-two characters or sixty-four characters plus a word space are detected by the character counter. The word space pulses from the output of AND gate 44 over lead 15 or the character space pulses from the output of AND gate 7 over lead 14 are applied to the character counter through OR gate 60 to trigger the 7-stage binary character counter flip-flop stages 61 through 67. A "one" state at the seventh flip-flop stage 67 indicates $2^6$ or sixty-four counts since this stage changes state cates $2^6$ or sixty-four counts since this stage changes state every sixty-four counts. A "one" state at the fourth flip-flop 64 indicates $2^3$ or eight counts since this stage changes state every eight counts. Therefore, when a "one" state is present at both the fourth flip-flop 64 and the seventh flip-flop 67, there have been present sixty-four plus eight character pulses (character pulses including word space pulses used to trigger the counter) or seventy-two character pulses. When both "one" state cnoditions are present at the input of AND gate 70, both a line feed through delay 72 and a carriage return pulse is sent through OR gate 71 to the binary/teletype code format converter 40. Also a reset pulse is sent through OR gate 71 to reset the seven flip-flop stages 61 through 67 of the character counter. The line feed delay 72 is provided to allow the carriage to be returned before line feed begins. When a word space finishes a line after the sixty-four character counts are counted at the seventh flip-flop stage 67, the word space pulse causes a line feed and carriage return pulse to be generated through OR gate 71. The word space pulses are provided at the output of AND gate 44 over lead 15 to AND gates 73 and 74. Any word space pulse enables AND gate 73 over lead 15 when the seventh flip-flop 67 is in the "one" or sixty-four character count state. This will then provide a line feed pulse and a carriage return pulse to the binary/teletype code format converter 40 and a reset pulse to the seven flip-flop stages 61 through 67 that make up the character counter. Word space pulses are provided to the binary/teletype code format converter 40 through AND gate 74. A word space inhibit pulse is provided to AND gate 74 from flip-flop 67 to prevent a word space pulse to binary/teletype code format converter 40 during carriage return.

The 5-digital teletype code provided at the output of binary/teletype code format converter 40 is converted into 6-bit serial form, shifted into a high speed buffer storage system, and rate converted into 100 w.p.m. 7-bit serial output data to drive a standard teleprinter. The frequency timing pulses for use in performing these functions are provided by a timing generator 97 in response to the output of clock 96. The timing generator 97 has three outputs. The first output provides timing pulses at the baud rate of 74.2 c.p.s. equivalent to 100 w.p.m. over lead 101. The second output provides timing pulses at the baud rate of 445.2 c.p.s. or six times (X6 baud) the baud rate over lead 102. The third output provides slightly delayed timing pulses at the frequency of 74.2 c.p.s. or baud rate over lead 98. The slightly delayed timing pulses are delayed so as to provide a timing pulse after each timing pulse occurring at the baud rate and prior to the first of the set of six high speed (445.2 c.p.s.) timing pulses generated between each timing pulse occurring at the baud rate.

The 5-bit digital teletype code produced by binary/teletype code format converter 40 is converted into 6-bit serial form by means of the parallel-to-serial code shift register made up of seven flip-flop stages 80 through 86. The 5-bit parallel teletype code is presented in reversed form to the second through the sixth flip-flop stages 81 through 85 from the binary/teletype code format converter 40. When data is present in any of the five bits in a manner to define a character or that a character space is present, a "one" state or "start" bit (the sixth bit) is placed in the seventh flip-flop stage 86 through OR gate 79. The "one" state in the seventh flip-flop stage 86 primes AND gate 95. Delayed pulses at the desired bit rate produced by a timing generator 97 in response to the output of a clock 96 are fed to a second input of the AND gate 95 over lead 98. The AND gate 95, responsive to a coincident condition at its inputs, operates to apply a set pulse to a flip-flop 99. Flip-flop 99 upon being set enables AND gate 100 to pass high speed (X6 baud) shift pulses from the timing generator 97 to the register including stages 80 through 86. The set condition of flip-flop 99 enables AND gate 103 over lead 104 to allow output of the high speed (X6 baud) serial data from the stages 80 through 86 of the register to buffer storage stages 110 through 113. The high speed (X6 baud) shift pulses at AND gate 100 are provided by clock pulses from clock generator 96 through timing generator 97 over lead 102. At the end of a set of six high speed (X6 baud) shift pulses when all of a given 5-bit plus start bit character is shifted out (at X6 baud/6 or baud time), a baud reset pulse is provided to flip-flop 99 from the timing generator 97 over the lead 101 to prohibit data output until, at the delayed baud rate, new data is present in the register.

In order to be compatible with teletype standards, the code must be accompanied by a "letters" or "figures" character whenever a change is required. Whenever a figure case appears, a figure shift pulse is provided by the operation of the shift register flip-flop 55 and the one-shot 56 to the binary/teletype code format converter 40 and via lead 57 to the flip-flop 88. The converter 40 operates to provide a reversed corresponding character in the shift register 80 through 86, namely, 00100. After six high speed shift pulses from timing generator 97 through AND gate 100 are used to clear the register 80 through 86, the figures character is dumped from the converter 40 into the second through the sixth flip-flop stages 81 through 85, the "start" pulse is fed in the seventh flip-flop stage 86 through OR gate 79, and the first flip-flop stage 80 is set through AND gate 87 which was enabled by the character space pulse at the output of AND gate 7 over lead 14 and by the figures pulse previously mentioned at the output of flip-flop 88. The "one" state at the seventh flip-flop stage 86 enables AND gate 95 to pass set pulses to flip-flop 99 at the delayed baud rate provided by the timing generator 97 over lead 98. When flip-flop 99 is set, an enable pulse is sent to AND gate 100 which allows six shift pulses provided by the timing generator 97 over lead 102 to be clocked out at the high speed (X6 baud) baud rate. At the end of the six high speed shift pulses, a "one" state appears at the seventh flip-flop stage 86 (the "one" state at the first flip-flop 80 shifted six times). The "one" in the seventh flip-flop stage 86 reprimes AND gate 95 and at the delayed baud rate sets flip-flop 99 providing six more shift pulses.

As a result of the shifting out, all flip-flops in the register 80 through 86 return to their normal "zero" condition and thereby the system returns to the "letters" case. The high speed serial data is then sent to the serial buffer storage (110, 111, 112, and 113).

This buffer storage system comprises a number of six-stage shift registers 110, 111, 112, and 113 which shift the high speed (X6 baud) data into the following shift register 130 or recirculate the data until the following shift register 130 is available. Availability is determined by the change of state in either of the flip-flop stages 114, 115, or 116. The flip-flop stages 114, 115, and 116 are shifted at the baud rate which is provided by the timing generator 97 over lead 101. In this manner a change in flip-flop state can occur only when the high speed (X6 baud) data has shifted one complete cycle through the six states of each shift register. When at the baud rate, no start bit is present at the output (no data condition) of either of the following shift registers 111, 112, and 113, the appropriate control flip-flop changes state and provides an enabling pulse to the appropriate AND gates 119, 121, and 123 to shift the data into the following register. When at the baud rate a start bit is present at the output (data condition) of either of the following shift registers 111, 112, and 113, the appropriate flip-flop provides an enabling pulse to the appropriate AND gates 118, 120, and 122 to recirculate the data until the following shift register is available. The presence of data at the previous stages provides the prime pulse to the AND gates 118, 119, 120, 121, 122, and 123 so that, for example, if a "one" state appears at the output of the second six-stage shift register 111 (indicating data), flip-flop 114 enables AND gate 118 and the data is stored by recirculation through AND gate 118 at the high speed X6 baud rate. In like manner, the presence of data in the third and fourth six-stage shift registers causes data to be recirculated through AND gates 120 and 122, respectively. If at the baud rate, no data is present in the memory, the output stages of all the six-stage shift registers 110, 111, 112, and 113 contain "zero." In this condition, the flip-flops 114, 115, and 116 change state and enable AND gates 119, 121, and 123, respectively, establishing a circuit path from the input of the first shift register 110 through the fourth shift register 113. A character now arriving at the input to the first shift register 110 will be shifted at the baud rate through the following shift registers 111, 112, 113, in order, and into a further six-stage shift register 130 for rate conversion from, for example, 445.2 c.p.s. to 74.2 c.p.s. Data is prevented from shifting into the rate converter during periods of carriage return code by an inhibit to AND gate 124 through AND gate 125.

While a typical rate conversion system is shown and will be described in brief by way of example, any suitable system may be employed. The rate conversion is accomplished by recirculating the 6-bit Baudot character read into six stage shift register 130 through AND gate 132. The high speed (445.2 c.p.s. ) 6-bit Baudot character is applied through AND gate 131 when flip-flop 135 is reset. When any new character is applied to the six stage shift register 130, a "one" or start bit level at the output of the register 130 sets flip-flop 135 over lead 151 which, in turn, resets a four stage counter 137 over lead 152 and flip-flop 138 over lead 153 through delay 139. When flip-flop 135 is in the S or set condition, an inhibit is provided to AND gate 125 through OR gate 147 and an enable is removed from AND gate 131 to prevent the shifting in of new data into the rate converter until the new 6-bit character is shifted out. The high speed 6-bit character is recirculated six times through AND gate 132 when flip-flop 135 is in the S or set position. Seven shift pulses are provided per circulation over lead 102 and through OR gate 133 to the six stage shift register 130. Six of the seven shift pulses to the six stage shift register 130 are provided to shift the register one complete circulation through the register. These six shift pulses are provided at the high speed X6 baud rate from timing generator 97 over lead 102. The seventh or extra shift pulse to the six stage shift register 130 is provided by the delayed baud over lead 98 through AND gate 134 when flip-flop 135 is set. This seventh or extra shift pulse advances the 6-bit Baudot character so that one bit of the character is shifted into a flip-flop 136 each circulation. Since this seventh shift pulse occurs at the baud rate and the frequency shift pulses to flip-flop 136 are provided at the baud rate from timing generator 97 over lead 101, the output of flip-flop 136 is read out at the teletype baud rate (74.2 c.p.s.). The four stage counter 137 provided in this converter operates at the delayed baud rate provided over lead 98. At the count of six when the 6-bit data has been advanced out through flip-flop 136, this counter 137 provides a reset pulse to the shift register 130. When shift register 130 is reset, the six stages in the register are returned to a zero condition which is the level used to indicate at the output of the flip-flop 136 a stop bit. The marking level appearing at the output of the flip-flop 136 and used to indicate the stop bit continues for two complete recirculations of the shift register 130 or for two bit time intervals until when, at the count of eight, the four stage counter 137 resets flip-flop 135 to enable AND gate 131 to apply a new high speed 6-bit Baudot character containing a start bit to the rate converter 130. This is, following the sixth recirculation of the converter register 130, the data bits are removed by resetting the register 130. The seventh recirculation during which no data bits appear at the output of the register 130 causes the flip-flop 136 to produce the first half of a stop bit. The eighth recirculation of the register 130 produces at the output of the flip-flop 136 the second half of the stop bit, and the gate 131 is thereafter operated to pass the six bits of the next code character to the register 130 whereupon the above operation is repeated. In this manner a complete 7-bit start stop code is provided including a start bit, a 5-bit Baudot code character, and a stop bit.

The rate conversion system shown by way of example allows for two carriage return signals which is the format required in standardized teletype equipment. When a carriage return character is applied to the register 130, a carriage return decoder 145 is enabled, enabling AND gate 146 with the decoded count "zero" from the four stage counter 137. This sets flip-flop 138 to provide a prime level to AND gate 148 over lead 154 and an inhibit to AND gate 125 via OR gate 147. When the carriage return character has been shifted out in the manner described for any 6-bit character, the decoded count 8 over lead 155 from the four stage counter 137 enables AND gate 148 to set into the shift register 130 a second carriage return code. The inhibit through OR gate 147 to AND gate 125 provided by the carriage return decoder 145 prevents high speed shifting to occur at shift register 113 when the decoded count 8 at the four stage counter 137 resets flip-flop 135 over lead 155. This inhibit thereby prevents new data from coming into the rate converter until after the second carriage return code is shifted out. After the second carriage return character has entered the register, the presence of the data at the output sets flip-flop 135 and the character is shifted out in the same manner as any other 6-bit character at the 100 w.p.m. through flip-flop 136 and solid state relay 149 to key a standard teleprinter.

By the above operation, flip-flop 136 operates to supply the teletype code characters via a solid state relay 144 or other suitable equipment to a standard teleprinter. Likewise, the 100 w.p.m. output can be fed to any other desired utilization circuit.

What is claimed is:

1. A code converter, comprising:

(a) means responsive to input signals characterized by two signal levels of varying time duration arranged in a coded sequence to produce over a first output path a first pluse each time said input signal shifts from a first of said signal levels to the second of said signals, to produce over a second outpath a second pulse each time said input signal shifts from said second signal level to said first signal level, to produce over a third output path a first voltage level so long as said input signal remains at said second signal level, and to produce a second voltage level so long as said input signal remains at said first signal level;

(b) means responsive to said first and second pulses and to said first and said second voltage levels to provide over a first output path a third pulse representing a predermined number of counts between said first and said second pulses with the presence of said voltage level and to provide over a second output path a fourth pulse representing said predetermined number of counts between said first and said second pulses with the presence of said second voltage level; and (c) means responsive to said first output pulses of said first mentioned means and said third and fourth output pulses to provide binary code representations of said input signal.

2. A code converter, comprsing:

(a) means responsive to input signals characterized by two signal levels of varying time duration arranged in a coded sequence to produce over a first output path a first pulse each time said input signal shifts from a first of said signal levels to the second of said signal levels, to produce over a second output path a second pulse each time said input signal shifts from said second signal levels to said first signal levels, to produce over a third ouput path a first voltage level so long as said input signal remains at said second signal level, and to produce a second voltage level so long as said input signal remains at said first signal level;

(b) means responsive to said first and second pulses and to said first and said second voltage levels to provide over a first output path a third pulse representing a predetermined number of counts between said first and said second pulses with the presence of said first voltage level to provide over a second output path a fourth pulse representing said predetermine number of counts different from said first mentioned predetermined number of counts between said first and said second pulses and the presence over said fourth path of said second voltage level; and (c) means responsive to said first output pulse of said first mentioned means and said third, fourth, and fifth output pulses of said second mentioned means to provide binary code representations of said input signal.

3. A code converter, comprising:

(a) an input means responsive to input signals characterized by two signal levels of varying time duration arranged in a coded sequence to produce over a first output path a first pulse each time said input signal shifts from a first of said signal levels, to produce over a second output path a second pulse time said input signal shifts from said second signal level to said first signal level, to produce over a third output path a first voltage level so long as said input signal remains at said second signal level, and to produce over a fourth output path a second voltage level so long as said input signal remains at said first signal level;

(b) a counting means responsive to said first and said second pulses and to first and second voltage levels to provide over a first output path a third pulse representing a predetermined number of counts between said first and said second pulses with the presence of said first voltage level and to provide over a second output path a fourth pulse representing said predetermined number of counts between said first and said second pulses with the presence of said second voltage level; and (c) shift register combining means whereby said register is shifted by said first output pulses of said input means, set by third output pulses, and set and reset by said fourth output pulses of said counting means to provide binary code characted representations of said input signal.

4. A code converter, comprising:

(a) an input means responsive to input signals characterized by two signal levels of varying time duration arranged in a coded sequence to produce over a first output path a first pulse each time said input signal shifts from a first of said signal levels to the second of said signal levels, to produce over a second output path a second pulse each time said input signal shifts from said second signal level to said first signal level, to produce over a third output path a first voltage level so long as said input signal remains at said second signal level, and to produce over a fourth output path a second voltage level so long as said input signal remains at said first signal level;

(g) a counting means responsive to said first and said second pulses and to said first and said second voltage levels to provide over a first output path a third pulse representing a predetermined number of counts between said first and said second pulses with the presence of said first voltage level, to provide over a second output path a fourth pulse representing said predetermined number of counts between said first and said second pulses with the presence of said second voltage level, and to provide over a third output path of fifth pulse representing a second predetermined number of counts different from said first mentioned predetermined number of counts between said first and mentioned predetermined number of counts between said first and said second pulses with the presence of said second voltage level; and (c) means including a shift register and responsive to said first output pulse of said input means and said third, fourth, and fifth output pulses of said counting means to provide binary code representations of said input signals.

5. A code converter, comprising:

(a) means responsive to input dot-dash Morse code signals characterized by mark and space signal levels of varying time duration to provide over a first output path a first pulse at the beginning of every mark signal level, to provide over a second output path a second pulse at the end of every mark signal level, to provide over a third output path a first voltage level so long as the input signal is a mark signal level, and to provide over a fourth output path a second voltage level so long as the input signal is a space signal level;

(b) means responsive to said first and said second pulses, and to said first and said second voltage levels to provide over a first output path a dash pulse representing a predetermined number of counts between said first and said second pulses with the presence of said first voltage level, to provide over a second output path a character space pulse representing said predetermined number of counts between said second and said first pulses with the presence of said second voltage level, and to provide over a third output path a word space pulse representing a second predetermined number of counts different from said first mentioned predetermined number of counts between said first and said second pulses with the presence of said second voltage level; and (c) means responsive to said first pulse, said dash pulses, said character space pulse, and said word space pulse to provide binary code representations of said input signals.

6. A code converter, comprising:

(a) an input means responsive to input dot-dash Morse code signals characterized by mark and space signal levels of varying time duration to provide over a first output path a first pulse at the beginning of every mark signal level, to provide over a second output path a second pulse at the end of every mark signal level, to provide over a third output path a first voltage level so long as the input signal is a mark signal level, and to provide over a fourth output pulse a second voltage level so long as the input signal is a space signal level;

(b) a counting means responsive to said first and said second pulses, and to said first and second voltage levels to provide over a first output path a dash pulse each time a predetermined number of counts is reached between said first pulse and said second pulse with the presence of said first voltage level, to provide over a second output path a character space pulse each time said predetermined number of counts is reached between said second pulse and said first pulse with the presence of said second voltage level, and to provide over a third output path a word space pulse each time a second predetermined number of counts different from said first mentioned predetermined number of counts is reached between said second pulse and said first pulse and the presence of said second voltage level;

(c) shift register means made up of binary stages whereby said register is shifted by said first pulses, set by said dash pulses, and reset and set by said character space pulses to provide binary code character representations of said input signals; and (d) means responsive to said word space pulses and said binary code character representations to provide binary code representations of said input signal.

7. A code converter, comprising:

(a) an input means responsive to input signals characterized by two signal levels of varying time duration arranged in a coded sequence to produce over a first output path a first pulse each time said input signal shifts from a first of said signal levels to the second of said signal levels, to produce over a second output path a second pulse each time said input signal shifts from said second signal level to said first signal level, to produce over a third output path a first voltage level so long as said input signal remains at said second signal level, and to produce over a fourth output path a second voltage level so long as said input signal remains at said first signal level;

(b) a counting means responsive to said first and said second pulses and to said first and second voltage levels to provide over a first output path a third pulse representing a predetermined number of counts between said first and said second pulses with the presence of said first voltage level, to provide over a second output path a fourth pulse representing a predetermined number of counts betwen said second and said first pulses with the presence of said second voltage level, and to provide over a third output path a fifth pulse representing a second predetermined number of counts different from said first mentioned predetermined number of counts between said second and said first pulse with the presence of said second voltage level over said fourth output path;

(c) a second counting means responsive to said fourth pulse provided over said second output path of said counting means and said fifth pulse provided over said third output path of said counting means to provide over a first output path a sixth pulse representing a line feed and over a second output path a seventh pulse representing a cariage return; and (d) a combining means responsive to said first output pulse of said input means, said third, fourth and fifth output pulses of said counting means and said sixth and seventh pulses at the output of said second counting means top rovide binary teletype code representations of said input signal.

8. A Morse code to binary converter, comprising:

(a) a detecting means responsive to dot-dash CW Morse input signals characterized by marks, which represent the presence of a signal, and spaces, which represent the absence of a signal, to produce a negative-going pulse during the presence of any signal;

(b) a pulse squaring means responsive to the negative-going pulses produced by the detecting means to produce over a first output path regenerated negative-going squared pulses and over a second output path a first voltage level;

(c) inverting means responsive to said regenerated negative-going pulses from said squaring means to provide over a first output path positive-going regenerated squared pulses and over a second output path a second voltage level;

(d) a differentiation means responsive to the positive-going squared pulses produced at the output of said inverter means to provide over a first output means a positive-going first pulse at the beginning of every positive-going input pulse, and to provide over a second output means a positive-going second pulse at the end of every positive-going input pulse;

(e) a digital counter means made up of a clock generator triggering several flip-flop stages arranged in binary fashion and responsive to said first positive-going first output pulse to provide over said first output means a third pulse representing a dash when the counter reaches a predetermined number of counts between said first positive-going pulse and said second positive-going pulse and there is present a second voltage level, to provide over said second output means a fourth pulse representing a character space when the counter reaches said predetermined number of counts between said second pulse and said first pulse and there is present a first voltage level, and to provide over said third output means a fifth pulse representing a word space when the counter reaches a second predetermined number of counts, different from said first mentioned predetermined number of counts, between said second and said first pulse and there is present a first voltage level;

(f) a shift register means made up of binary flip-flop stages arranged as in standard shift register fashion whereby said register is shifted by said first output pulse, said first flip-flop stake of said register set by said third pulse representing a dash and said fourth pulse representing a character space, and said remaining stages of said register are reset by said fourth pulse representing a character space so as to provide binary code character representations of said input signal; and (g) means responsive to said fifth pulse representing a word space and said binary code character representations of said input signal to provide binary code representations of said input signals.

9. A code converter, comprising:

(a) an input means responsive to input dot-dash Morse code signals characterized by mark and space signal levels of varying time duration to provide over a first output path a first pulse at each transition of said signal from said space to said mark level, to provide over a second output path a second pulse at each transition of said signal from said mark to said space level, to provide over a third output path a mark voltage level so long as the input signal is at said mark signal level, and to provide over a fourth output path a space voltage level so long as the input signal is at said space signal level;

(b) a counting means responsive to said first and said second pulses and to said mark and space voltage levels to provide over a first output path a third pulse which represents a dash each time a predetermined number of counts is reached between said first pulse and said second pulse with the presence of said mark voltage level, to provide over a second output path a fourth pulse which represents a character space each time said predetermined number of counts is reached between said second pulse and said first pulse with the presence of said space voltage level, and to provide over a third output path a fifth pulse which represents a word space each time a second predetermined number of counts different from said first mentioned predetermined number of counts is reached between said second pulse and said first pulse with the presence of said space voltage level;

(c) means including a second counter responsive to said fourth character space pulse and said fifth word space pulse to provide over a first output path a sixth carriage return pulse, to provide over a second output path a seventh word space pulse, and to provide over a third output path an eighth line feed pulse;

(d) shift register means arranged to be shifted by said first pulses, set by said third dash pulses, and set and reset by said fourth character space pulses to provide binary code character representations of said input signal;

(e) decoding and encoding means responsive to said binary code character representations of said input signal, to said seventh word space pulses, to said sixth carriage return pulses, and to said eighth line feed pulses to provide 5-bit parallel binary code representations of said input signal;

(f) a generation means for the generation of a first pulse train at a first pulse repetition rate, for the generation of a second pulse train at a second pulse repetition rate which is an integral multiple of said first rate, and for the generation of a third pulse train which is at the same pulse repetition rate as said first pulse train but is delayed;

(g) means to said 5-bit parallel binary code representations of said input signal at the output of said decoding-encoding means and to said first, second, and third pulse trains to provide 6-bit serial binary code at the rate of said second pulse train;

(h) a buffer memory means responsive to said 6-bit serial binary code and to said first and second pulse trains to provide in one condition over a first output path a recirculation of said 6-bit serial binary code within said buffer memory means and in a second condition over a second output path progression of said 6-bit serial binary code into a rate conversion means; and (i) rate conversion means responsive to said 6-bit serial binary code and said first, second, and third pulse trains to provide an output binary serial code at a desired rate.

References Cited

UNITED STATES PATENTS

| | | | |
|---|---|---|---|
| 2,801,406 | 7/1957 | Lubkin | 235—92 X |
| 3,196,210 | 7/1965 | Murray | 178—26 |
| 3,267,456 | 8/1966 | Morris et al. | 340—347 |

MAYNARD R. WILBUR, Primary Examiner

G. R. EDWARDS, Assistant Examiner

U.S. Cl. X.R.

178—26; 235—154

PO-1050
(5/69)

UNITED STATES PATENT OFFICE
CERTIFICATE OF CORRECTION

Patent No. 3,505,667 Dated April 7, 1970

Inventor(s) Sidney Wald and Leroy Werner

It is certified that error appears in the above-identified patent and that said Letters Patent are hereby corrected as shown below:

Col. 2, line 3, correct "or" second occurrence to read -- of --.

Col. 4, line 9, correct "states" second occurrence to read -- stages --; Col. 4, line 31, correct "21" to read -- $2^1$ --.

Col. 7, line 6, correct "that" to read -- what --.

Col. 8, line 44, correct "5-digital" to read -- 5-bit digital --.

Col. 12, lines 24 and 25, correct "predetermine" to read -- predetermined --; Col. 12, line 25, after "counts" insert -- between said first and said second pulses with the presence of said second voltage level, and to provide over a third output path a fifth pulse representing second predetermined number of counts --; Col. 12, line 40, after "levels" insert -- to the second of said signal levels --; Col. 12, line 41, after "pulse" insert -- each --; Col. 12, line 63, correct "characted" to read -- character --.

Col. 13, line 4, correct "(g)" to read -- (b) --; Col. 13, line 14, before "fifth" correct "of" to read -- a --; Col. 13, lines 17 and 18, after "first" delete "and mentioned predetermined number of counts between said first".

Col. 14, line 59, correct "top rovide" to read -- to provide --.

Col. 15, line 33, correct "stake" to read -- stage --.

SIGNED AND SEALED

SEP 29 1970

(SEAL)
Attest:

Edward M. Fletcher, Jr.
Attesting Officer

WILLIAM E. SCHUYLER, JR.
Commissioner of Patents